United States Patent
Dolan et al.

(10) Patent No.: US 12,083,471 B2
(45) Date of Patent: Sep. 10, 2024

(54) ADSORBENT BED WITH INCREASED HYDROTHERMAL STABILITY

(71) Applicant: BASF Corporation, Florham Park, NJ (US)

(72) Inventors: William B. Dolan, Iselin, NJ (US); Justin Pan, Iselin, NJ (US); Alfonse Maglio, Iselin, NJ (US); Margaret Anne Greene, Iselin, NJ (US); Tobias Eckardt, Nienburg/Weser (DE)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 17/246,583

(22) Filed: Apr. 30, 2021

(65) Prior Publication Data
US 2021/0339187 A1    Nov. 4, 2021

Related U.S. Application Data

(60) Provisional application No. 63/044,829, filed on Jun. 26, 2020, provisional application No. 63/018,990, filed on May 1, 2020.

(51) Int. Cl.
| | |
|---|---|
| *B01D 53/04* | (2006.01) |
| *B01D 53/26* | (2006.01) |
| *B01J 20/08* | (2006.01) |
| *B01J 20/10* | (2006.01) |
| *B01J 20/16* | (2006.01) |
| *B01J 20/18* | (2006.01) |
| *B01J 20/28* | (2006.01) |

(52) U.S. Cl.
CPC ..... *B01D 53/0462* (2013.01); *B01D 53/0423* (2013.01); *B01D 53/261* (2013.01); *B01J 20/08* (2013.01); *B01J 20/103* (2013.01); *B01J 20/165* (2013.01); *B01J 20/18* (2013.01); *B01J 20/28052* (2013.01); *B01D 2253/108* (2013.01); *B01D 2256/24* (2013.01); *B01D 2256/245* (2013.01); *B01D 2257/7022* (2013.01); *B01D 2257/80* (2013.01); *B01D 2259/402* (2013.01); *B01D 2259/403* (2013.01); *B01D 2259/404* (2013.01); *B01D 2259/4145* (2013.01)

(58) Field of Classification Search
None
See application file for complete search history.

(56) References Cited

U.S. PATENT DOCUMENTS

| | | | |
|---|---|---|---|
| 8,133,302 B2 | 3/2012 | Northrop et al. | |
| 10,850,225 B2 | 12/2020 | Sharma et al. | |
| 2007/0006732 A1* | 1/2007 | Mitariten | B01D 53/1462 95/237 |
| 2013/0291723 A1* | 11/2013 | Zhou | F25J 1/0255 96/121 |

(Continued)

OTHER PUBLICATIONS

International Search Report and Written Opinion of Application No. PCT/US2021/030360 mailed Nov. 5, 2021, 12 pgs.

(Continued)

*Primary Examiner* — Renee Robinson
(74) *Attorney, Agent, or Firm* — Lowenstein Sandler LLP

(57) ABSTRACT

Disclosed in certain embodiments are methods of removing water from a gas feed stream comprising hydrocarbons and water during an adsorption step of an adsorption cycle.

15 Claims, 12 Drawing Sheets

(56) References Cited

U.S. PATENT DOCUMENTS

2016/0187057 A1* 6/2016 Meyer .................... F25J 3/0209
 62/630
2019/0299153 A1 10/2019 Doong et al.

OTHER PUBLICATIONS

Fichtner-Schmittler et al., "Hydrothermal damage of ion-exchanged A-type zeolite cation-directed mechanisms of phase transformation," Zeolites, vol. 12, Jul./Aug. 1992, pp. 750-755.
Suckow et al., "Calculation of the hydrothermal long-term stability of zeolites in gas-desulphurization and gas-drying processes," Gas Separation & Purification, vol. 6, No. 2, 1992, pp. 101-108.

* cited by examiner

ADSORBENT BED WITH INCREASED HYDROTHERMAL STABILITY

CROSS-REFERENCE TO RELATED APPLICATION(S)

This application claims the benefit of priority of U.S. Provisional Patent Application No. 63/018,990, filed on May 1, 2020, and U.S. Provisional Patent Application No. 63/044,829, filed on Jun. 26, 2020, the contents of which are hereby incorporated by reference herein in their entirety.

BACKGROUND

Dehydration of natural gas to cryogenic specifications is critical in the pretreatment process for liquified natural gas (LNG) production. Zeolitic molecular sieves are used in such processes because they allow for the natural gas to meet the required dewpoint for liquefaction. Failure to reach this required dewpoint may result in the inability to maintain the necessary gas flow to the liquefaction section, which can constrain or shutdown the production of LNG.

Hydrothermal damage and retrograde condensation in dehydrator vessels during regeneration and adsorption lead to degradation of the molecular sieve adsorbent through leaching of the clay binder and loss of adsorption capacity. In addition, the presence of sulfur-containing hydrocarbons (e.g., mercaptans) may lead to the formation of $H_2S$ under the process conditions, which may also have a deleterious effect on the molecular sieve. Such effects can result in an increase in pressure drop and an uneven distribution of adsorption and/or regeneration flow, ultimately requiring premature replacement of the adsorbent.

BRIEF DESCRIPTION OF THE DRAWINGS

The present disclosure is illustrated by way of example, and not by way of limitation, in the figures of the accompanying drawings, in which.

SUMMARY

Figure 1A:
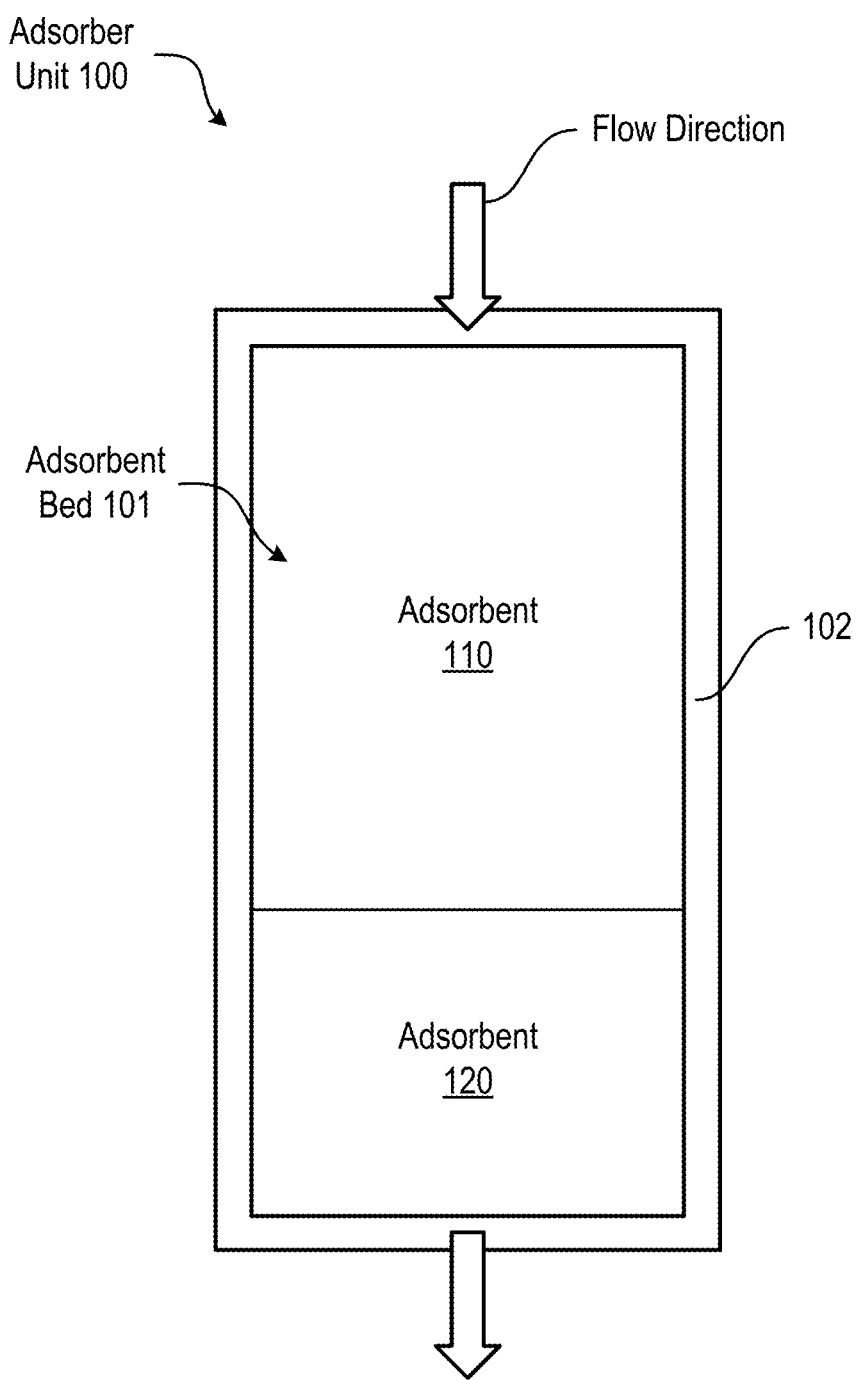
FIG. 1A illustrates an adsorber unit in accordance with at least one embodiment of the disclosure.

The following presents a simplified summary of various aspects of the present disclosure in order to provide a basic understanding of such aspects. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

One aspect of the present disclosure relates to a method of removing water from a gas feed stream comprising hydrocarbons and water during an adsorption step of an adsorption cycle, the method comprising: directing the gas feed stream having an initial water mole fraction toward an adsorbent bed, the adsorbent bed comprising: a first adsorbent layer comprising an adsorbent that is preferentially selective for C6+ hydrocarbons and comprises one or more of an amorphous silica adsorbent, an amorphous silica-alumina adsorbent, or a high-silica zeolite adsorbent; and a second adsorbent layer downstream from the first adsorbent layer to remove remaining water, the second adsorbent layer comprising a zeolite. In at least one embodiment, the gas feed stream has a reduced water mole fraction when the gas feed stream reaches the second adsorbent layer that is maintained for at least 90% of the duration of the adsorption step, and the reduced water mole fraction is less than or equal to about 90% of the initial water mole fraction.

In at least one embodiment, the reduced water mole fraction is less than about 90%, about 80%, about 70%, about 60%, about 50%, about 40%, about 30%, about 20%, about 10%, about 9%, about 8%, about 7%, about 6%, about 5%, about 4%, about 3%, about 2%, or about 1% of the initial water mole fraction.

In at least one embodiment, the reduced water mole fraction is less than about 20% of the initial water mole fraction.

In at least one embodiment, the reduced water mole fraction is maintained for at least 95%, at least 96%, at least 97%, at least 98%, at least 99%, or 100% of the duration of the adsorption step.

In at least one embodiment, the reduced water mole fraction is maintained for 100% of the duration of the adsorption step.

In at least one embodiment, the reduced water mole fraction is less than or equal to about 500 ppm, about 450 ppm, about 400 ppm, about 350 ppm, about 300 ppm, about 250 ppm, about 200 ppm, about 150 ppm, about 100 ppm, about 50 ppm, about 40 ppm, about 30 ppm, about 20 ppm, about 10 ppm, or about 5 ppm.

In at least one embodiment, the reduced water mole fraction is less than or equal to about 100 ppm, about 50 ppm, about 10 ppm, about 9 ppm, about 8 ppm, about 7 ppm, about 6 ppm, about 5 ppm, about 4 ppm, about 3 ppm, about 2 ppm, or about 1 ppm.

In at least one embodiment, the first adsorbent layer comprises the amorphous silica adsorbent and/or the amorphous silica-alumina adsorbent.

In at least one embodiment, the first adsorbent layer comprises the high-silica zeolite adsorbent.

In at least one embodiment, the high-silica zeolite adsorbent comprises ZSM-5, zeolite Y, or beta zeolite.

In at least one embodiment, the second adsorbent layer comprises one or more of zeolite A, zeolite X, or zeolite Y.

In at least one embodiment, the second adsorbent layer comprises one or more of zeolite 3A, zeolite 4A or zeolite 5A.

In at least one embodiment, the zeolite is exchanged with an element selected from Li, Na, K, Mg, Ca, Sr, or Ba.

In at least one embodiment, the adsorbent bed further comprises a third adsorbent layer downstream from the second adsorbent layer, the third adsorbent layer comprising an amorphous silica adsorbent or an amorphous silica-alumina adsorbent.

In at least one embodiment, the adsorbent bed further comprises a third adsorbent layer downstream from the second adsorbent layer, the third adsorbent layer comprising zeolite X or zeolite Y.

In at least one embodiment, the adsorbent bed further comprises a third adsorbent layer downstream from the second adsorbent layer, the third adsorbent having a higher selectivity to n-pentane over methane.

In at least one embodiment, the adsorbent bed further comprises a third adsorbent layer upstream from the first adsorbent layer, the third adsorbent layer comprising a water stable adsorbent.

In at least one embodiment, the water stable adsorbent is an amorphous silica or amorphous silica-alumina adsorbent.

In at least one embodiment, the gas feed stream is a natural gas feed stream.

In at least one embodiment, a final water mole fraction of the gas feed stream leaving the adsorbent bed is below 1 ppm or below 0.1 ppm.

In at least one embodiment, the method further comprises forming a liquefied natural gas product from the gas feed stream after leaving the adsorbent bed.

In at least one embodiment, the method further comprises forming a C2+ or C3+ natural gas liquid feed stream from the gas feed stream after leaving the adsorbent bed.

In at least one embodiment, the contacting is performed as part of a thermal swing adsorption process having a cycle time of less or equal to about 8 hours, about 7 hours, about 6 hours, about 5 hours, about 4 hours, about 3 hours, about 2 hours, or about 1 hour.

In at least one embodiment, one or more components of the hydrocarbons in the gas feed stream has is reduced by 100%, 90%, 80%, 70%, 60%, 50%, 40%, 30%, 20%, 10%, or 5% on a molar basis relative to an initial concentration of that component in the gas feed stream. In at least one embodiment, the one or more components are selected from benzene, C9 hydrocarbons, C8 hydrocarbons, C7 hydrocarbons, C6 hydrocarbons, or C5 hydrocarbons.

In at least one embodiment, the method further comprises, prior to directing the gas feed stream toward the adsorbent bed, retrofitting the adsorbent bed by removing and replacing at least a portion of a previously present adsorbent with one or more of the first adsorbent layer or the second adsorbent layer.

Another aspect of the present disclosure relates to a thermal swing adsorption method to perform hydrocarbon removal and water removal in a single adsorbent bed, the method comprising: directing the gas feed stream having an initial water mole fraction toward the adsorbent bed, the adsorbent bed comprising: a first adsorbent layer to remove C6+ hydrocarbons and water from the gas feed stream; and a second adsorbent layer downstream from the first adsorbent layer to remove remaining water from the gas feed stream. In at least one embodiment, the gas feed stream has a reduced water mole fraction when the gas feed stream reaches the second adsorbent layer that is maintained for at least 90% of the duration of each adsorption step of an adsorption cycle.

Another aspect of the present disclosure relates to a natural gas adsorption system adapted to perform any of the foregoing methods.

Another aspect of the present disclosure relates to a thermal swing adsorption method to perform hydrocarbon removal and water removal in a single adsorbent bed, the method comprising: directing a gas feed stream having an initial water mole fraction toward the adsorbent bed, the adsorbent bed comprising a first layer comprising one or more of amorphous silica, amorphous silica-alumina, or high-silica zeolite, and a second layer comprising zeolite. In at least one embodiment, a regeneration gas of the thermal swing adsorption method is the product gas of the thermal swing adsorption method or an external dry gas, a time of an adsorption step is less than 6, 4, 2, or 1 hours, the gas feed stream after leaving the adsorbent bed contains less than 1 ppm or less than 0.1 ppm water, and the gas feed stream after leaving the adsorbent bed has a reduced hydrocarbon mole fraction. In at least one embodiment, the gas feed stream is further processed to produce NGLs or LNG.

Another aspect of the present disclosure relates to an adsorbent bed adapted for removing water and C6+ hydrocarbons from a gas feed stream, the adsorbent bed comprising: a first adsorbent layer comprising one or more of a silica adsorbent, a silica-alumina adsorbent, or a high-silica zeolite adsorbent to remove C6+ hydrocarbons and water from the gas feed stream; and a second adsorbent layer downstream from the first adsorbent layer to remove remaining water from the gas feed stream, the second adsorbent layer comprising a zeolite. In at least one embodiment, a volume ratio of the first adsorbent layer to the second adsorbent layer is selected such that contact of the gas feed stream having an initial water mole fraction with the first adsorbent layer results in a reduced water mole fraction prior to contact with the second adsorbent layer that is maintained for at least 90% of the duration of an adsorption step in which the adsorbent bed is utilized.

In at least one embodiment, the reduced water mole fraction is less than about 90%, about 80%, about 70%, about 60%, about 50%, about 40%, about 30%, about 20%, about 10%, about 9%, about 8%, about 7%, about 6%, about 5%, about 4%, about 3%, about 2%, or about 1% of the initial water mole fraction.

In at least one embodiment, the reduced water mole fraction is less than or equal to about 450 ppm, about 400 ppm, about 350 ppm, about 300 ppm, about 250 ppm, about 200 ppm, about 150 ppm, about 100 ppm, about 50 ppm, about 40 ppm, about 30 ppm, about 20 ppm, about 10 ppm, or about 5 ppm.

In at least one embodiment, the reduced water mole fraction is maintained for at least 95%, at least 96%, at least 97%, at least 98%, at least 99%, or 100% of the duration of the adsorption step.

In at least one embodiment, the reduced water mole fraction is maintained for 100% of the duration of the adsorption step.

In at least one embodiment, the reduced water mole fraction is less than about 10 ppm, about 9 ppm, about 8 ppm, about 7 ppm, about 6 ppm, about 5 ppm, about 4 ppm, about 3 ppm, about 2 ppm, or about 1 ppm.

In at least one embodiment, the first adsorbent layer comprises the amorphous silica adsorbent and/or the amorphous silica-alumina adsorbent.

In at least one embodiment, the first adsorbent layer comprises the high-silica zeolite adsorbent.

In at least one embodiment, the high-silica zeolite adsorbent comprises ZSM-5, zeolite Y, or beta zeolite.

In at least one embodiment, the second adsorbent layer comprises one or more of zeolite A, zeolite X, or zeolite Y.

In at least one embodiment, the second adsorbent layer comprises one or more of zeolite 3A, zeolite 4A, or zeolite 5A.

In at least one embodiment, the zeolite is exchanged with an element selected from Li, Na, K, Mg, Ca, Sr, or Ba.

In at least one embodiment, the adsorbent bed further comprises a third adsorbent layer downstream from the second adsorbent layer, the third adsorbent layer comprising an amorphous silica adsorbent or an amorphous silica-alumina adsorbent.

In at least one embodiment, the adsorbent bed further comprises a third adsorbent layer downstream from the second adsorbent layer, the third adsorbent layer comprising zeolite X or zeolite Y.

In at least one embodiment, the adsorbent bed further comprises a third adsorbent layer downstream from the second adsorbent layer, the third adsorbent having a higher selectivity to C5 over methane.

In at least one embodiment, the adsorbent bed further comprises a third adsorbent layer upstream from the first adsorbent layer, the third adsorbent layer comprising a water stable adsorbent.

In at least one embodiment, the water stable adsorbent is an amorphous silica or amorphous silica-alumina adsorbent.

Another aspect of the present disclosure relates to natural gas purification system comprising the any of the foregoing adsorbent beds.

DETAILED DESCRIPTION

The present disclosure relates generally to methods of removing water from a gas feed stream comprising hydrocarbons and water during an adsorption step of an adsorption cycle, as well as to adsorbent beds adapted for the same. Some embodiments relate to a single adsorber unit for removing both hydrocarbons (e.g., C5+ or C6+ hydrocarbons, mercaptans, aromatics, aliphatic C8+ or C9+ hydrocarbons, etc.) and water down to cryogenic specifications for producing liquefied natural gas (LNG), rather than utilizing two or more separate adsorber units. Other embodiments relate to the use of multiple adsorber units for performing the same.

In general, molecular sieves, such as 4A and 3A zeolites, are often used to dry natural gas feed streams. Although these materials beneficially remove water from natural gas at the conditions of the operating units (i.e., high pressure methane and high water concentration), they are subject to hydrothermal damage. While there are other mechanisms that can damage the sieves (e.g., refluxing) which may be mitigated, hydrothermal damage appears unavoidable. Silica-based materials have been shown to be highly robust in this application with practical field experience where the adsorbent has lasted more than ten years in comparable environments; however, these materials are generally not used to remove water to cryogenic specifications required for forming liquefied natural gas.

Some embodiments described herein advantageously utilize an amorphous silica adsorbent, an amorphous silica-alumina adsorbent, a high-silica zeolite adsorbent (e.g., beta zeolite, ZSM-5, high-silica Y zeolite, etc.), or combinations thereof, with a less hydrothermally stable adsorbent (e.g., zeolite 3A or 4A) as separate adsorbent layers to produce a robust, longer-lasting adsorbent system. In such embodiments, the mole fractions of water entering the section of an adsorbent bed containing the less hydrothermally stable adsorbent is reduced by the upstream layer of the adsorbent bed. Since there is lower mole fraction of water entering the less hydrothermally stable adsorbent during the adsorption step, there is also less water to desorb during the regeneration step and hence a lower steaming environment is created during regeneration. This is advantageous as it is known to those skilled in the art that a steaming environment can damage zeolites. While adsorbent layers may be distributed across multiple adsorbent beds in different adsorber units, some embodiments can advantageously allow for hydrocarbon adsorption and water adsorption to be performed in a single adsorber unit while being able to reduce the water mole fraction below a cryogenic maximum. This reduces the total number of adsorber units needed, thus reducing the physical size of the natural gas processing facility.

The adsorption process of the present disclosure, used to remove mercaptans, heavy hydrocarbons (e.g., C5+ or C6+ components), and/or water from gas feed streams (e.g., a natural gas feed streams), may be accomplished by thermal swing adsorption (TSA). TSA processes are generally known in the art for various types of adsorptive separations. Generally, TSA processes utilize the process steps of adsorption at a low temperature, regeneration at an elevated temperature with a hot purge gas, and a subsequent cooling down to the adsorption temperature. TSA processes are often used for drying gases and liquids and for purification where trace impurities are to be removed. TSA processes are often employed when the components to be adsorbed are strongly adsorbed on the adsorbent, and thus heat is required for regeneration.

A typical TSA process includes adsorption cycles and regeneration (desorption) cycles, each of which may include multiple adsorption steps and regeneration steps, as well as cooling steps and heating steps. The regeneration temperature is higher than the adsorption temperature in order to effect desorption of water, mercaptans, and heavy hydrocarbons. To illustrate, during the first adsorption step, which employs an adsorbent for the adsorption of C5+ or C6+ components from a gas stream (e.g., a raw natural gas feed stream), the temperature is maintained at less than 150° F. (66° C.) in some embodiments, and from about 60° F. (16° C.) to about 120° F. (49° C.) in other embodiments. In the regeneration step of the present disclosure, water and the C5+ or C6+ components adsorbed in the adsorbent bed initially are released from the adsorbent bed, thus regenerating the adsorbent at temperatures from about 300° F. (149° C.) to about 550° F. (288° C.) in some embodiments.

In the regeneration step, part of one of the gas streams (e.g., a stream of natural gas), the product effluent from the adsorber unit, or a waste stream from a downstream process can be heated, and the heated stream is circulated through the adsorbent bed to desorb the adsorbed components. In some embodiments, it is advantageous to employ a hot purge stream comprising a heated raw natural gas stream for regeneration of the adsorbent.

In some embodiments, the pressures used during the adsorption and regeneration steps are generally elevated at typically 700 to 1500 psig. Typically, heavy hydrocarbon adsorption is carried out at pressures close to that of the feed stream and the regeneration steps may be conducted at about the adsorption pressure or at a reduced pressure. When a portion of an adsorption effluent stream is used as a purge gas, the regeneration may be advantageously conducted at about the adsorption pressure, especially when the waste or purge stream is re-introduced into the raw natural gas stream, for example.

As used herein, a "mercaptan" refers to an organic sulfur-containing compound including, but not limited to, methyl mercaptans (C1-RSH), ethyl mercaptans (C2-RSH), propyl mercaptans (C3-RSH), butyl mercaptans (C4-RSH), dimethyl sulfide (DMS), and dimethyl disulfide (DMDS).

While embodiments of the present disclosure are described with respect to natural gas purification processes, it is to be understood by those of ordinary skill in the art that the embodiments herein may be utilized in or adapted for use in other types of industrial applications that require mercaptans and/or water removal in addition to LNG and natural gas liquid (NGL) applications.

FIG. 1A illustrates an adsorber unit 100 in accordance with at least one embodiment of the disclosure. In some embodiments, the adsorber unit 100 includes a single vessel 102 that houses an adsorbent bed 101. Other embodiments may utilize multiple vessels and adsorbent beds, for example, when implementing a continuous TSA process where one or more adsorbent beds are subject to an adsorption cycle while one or more beds are subject to a regeneration cycle. For example, the adsorber unit 100 may include, in some embodiments, two or more vessels and adsorbent beds that are duplicates of the vessel 102 and the adsorbent bed 101 (not shown). While the adsorbent bed 101 is subjected to an adsorption cycle, a duplicate adsorbent bed is subjected to a regeneration cycle, for example, using a product gas resulting from the adsorption cycle performed with the adsorbent bed 101.

The adsorbent bed 101 includes adsorbent layer 110 and adsorbent layer 120, contained inside a vessel 102. The flow direction indicates the flow of a gas feed stream through an inlet of the vessel 102, through the adsorbent layer 110, and then through the adsorbent layer 120 before reaching an outlet of the vessel 102. Adsorbent layer 120 is said to be downstream from adsorbent layer 110 based on this flow direction. In some embodiments, each adsorbent layer may comprise their respective adsorbents in a form of adsorbent beads having diameters, for example, from about 1 mm to about 5 mm. The relative sizes of the adsorbent layers is not necessarily drawn to scale, though in certain embodiments a weight percent (wt. %) of the adsorbent layer 110 with respect to a total weight of the adsorbent bed 101 (i.e., a total weight of the adsorbent layer 110 and the adsorbent layer 120) may be greater than 50 wt. %, greater than 60 wt. %, greater than 70 wt. %, greater than 80 wt. %, or greater than 90 wt. %.

Figure 1B:
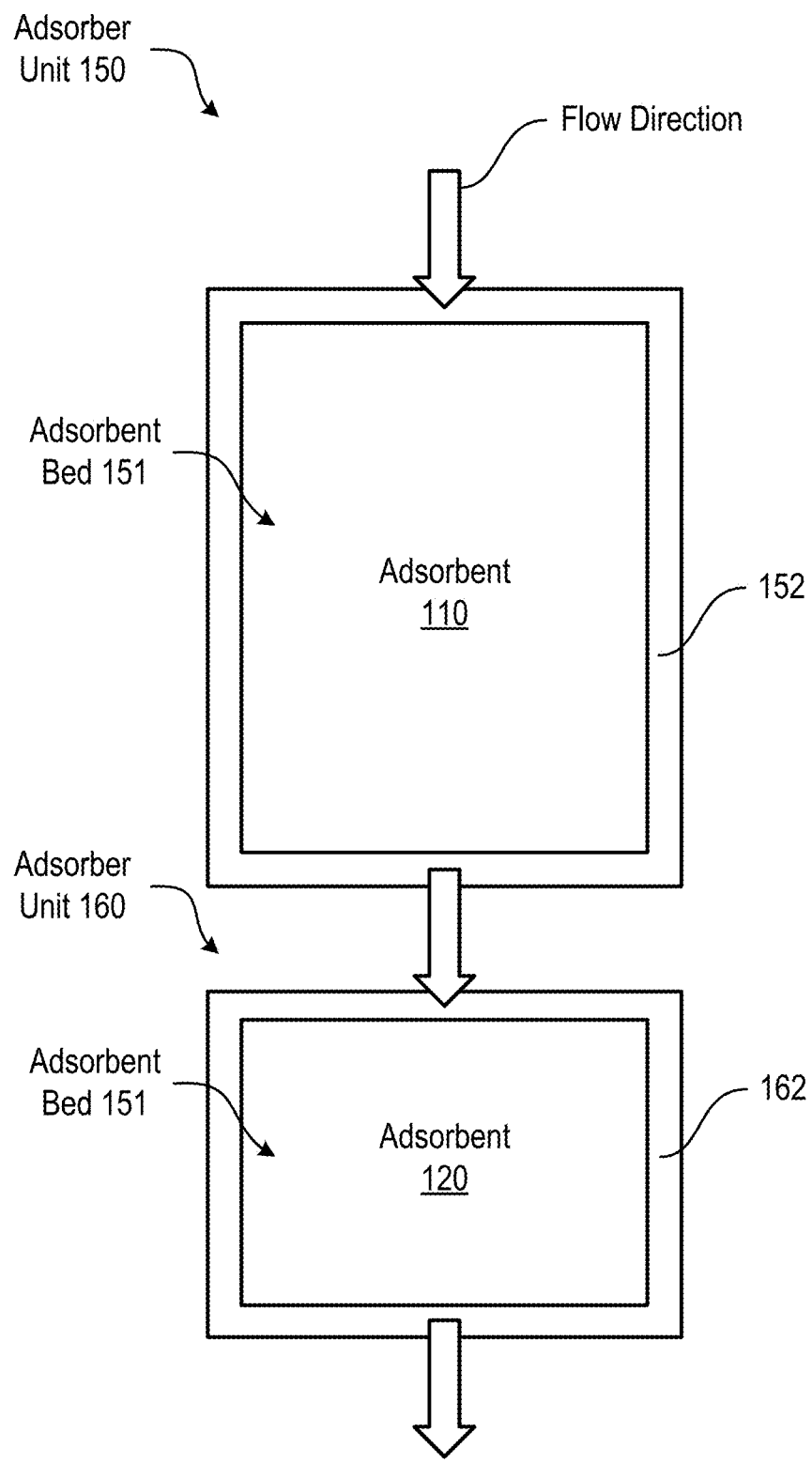
FIG. 1B illustrates a variation of the configuration of FIG. 1A which includes multiple adsorber units in accordance with at least one embodiment of the disclosure.

While it is contemplated that a single adsorber unit may be used with the various embodiments described herein, two or more adsorber units may be utilized for the various embodiments described herein. FIG. 1B shows a variant of FIG. 1A, where separate adsorber units 150 and 160 are used, each having separate vessels 152 and 162, respectively, for housing adsorbent beds 151 and 161, respectively. As shown, the adsorbent layer 110 is contained in the vessel 152 of the adsorber unit 150, and the adsorbent layer 120 is contained within the vessel 162 of the adsorber unit 160, with the adsorber unit 160 being downstream from the adsorber unit 150. In some embodiments, the adsorber unit 150 is utilized for heavy hydrocarbon adsorption removal from the gas feed stream, and the adsorber unit 160 is utilized for dehydration of the gas feed stream. Though FIG. 1B provides a simplified view of the adsorber units 150 and 160, it is to be understood that various other components may be present, including heaters, coolers, various valves and connective elements, and controllers to regulate mass flow to, from, and between the adsorber units 150 and 160. Also, as with FIG. 1A, each adsorber unit 150 and 160 may include duplicate vessels and adsorbent beds used to facilitate the implementation of a continuous TSA process.

In some embodiments, the adsorbent layer 110 comprises an adsorbent that is preferentially selective for C5+ or C6+ hydrocarbons. As used herein, the terms "preferentially selective for" or "selective for" indicates that the adsorbent adsorbs the specified compound at a greater equilibrium loading compared to methane, further described by the following equation: selectivity=(loading C6+/concentration C6+)/(loading C1/concentration C1), where C1 is methane, and where loading is defined as moles of component adsorbed/gram of adsorbent. In certain embodiments, C5+ or C6+ compounds may comprise one or more of pentane, hexane, benzene, heptane, octane, nonane, toluene, ethylbenzene, xylene, or neopentane.

In some embodiments, the adsorbent layer 110 comprises one or more of an amorphous silica adsorbent, an amorphous silica-alumina adsorbent, or a high-silica zeolite adsorbent. In some embodiments, the adsorbent layer 110 comprises an amorphous silica adsorbent and/or an amorphous silica-alumina adsorbent. Amorphous silica adsorbents and amorphous silica-alumina adsorbents may be at least partially crystalline. In some embodiments, an amorphous silica adsorbents or an amorphous silica-alumina adsorbent may be at least 50% amorphous, at least 60% amorphous, at least 70% amorphous, at least 80% amorphous, at least 90% amorphous, or 100% amorphous. In some embodiments, an amorphous silica adsorbents or an amorphous silica-alumina adsorbent may further include other components, such as adsorbed cations. An exemplary adsorbent for use in the adsorbent layer 110 may be Durasorb™ HC (available from BASF). In some embodiments, the adsorbent layer 110 comprises a high-silica zeolite adsorbent, such as beta zeolite, ZSM-5, Y zeolite, or combinations thereof. As used herein, "high-silica zeolite" refers to a material having a silica-to-alumina ratio, on a molar basis, of at least 5, of at least 10, of at least 20, at least 30, at least 50, at least 100, at least 150, at least 200, at least 250, at least 300, at least 350, at least 400, at least 450, or at least 500, or within any range defined therebetween (e.g., 5 to 500, 10 to 500, 10 to 400, 20 to 300, etc.). In some embodiments, the silica to alumina ratio is in the range of from 20 to 500.

In some embodiments, the adsorbent layer 120 comprises a zeolite, which may be less hydrothermally stable than the adsorbent(s) of the adsorbent layer 110. In some embodiments, the adsorbent layer 120 comprises one or more of zeolite A, zeolite X (e.g., zeolite 13X, which is zeolite X that has been exchanged with sodium ions), or zeolite Y. An exemplary adsorbent for use in the adsorbent layer 120 may be Durasorb™ HR4 (available from BASF). In some embodiments, the adsorbent layer 120 comprises one or more of zeolite 3A or zeolite 4A. In some embodiments, the zeolite is exchanged with any element of columns I and II of the periodic table, such as Li, Na, K, Mg, Ca, Sr, or Ba.

Figure 2A:
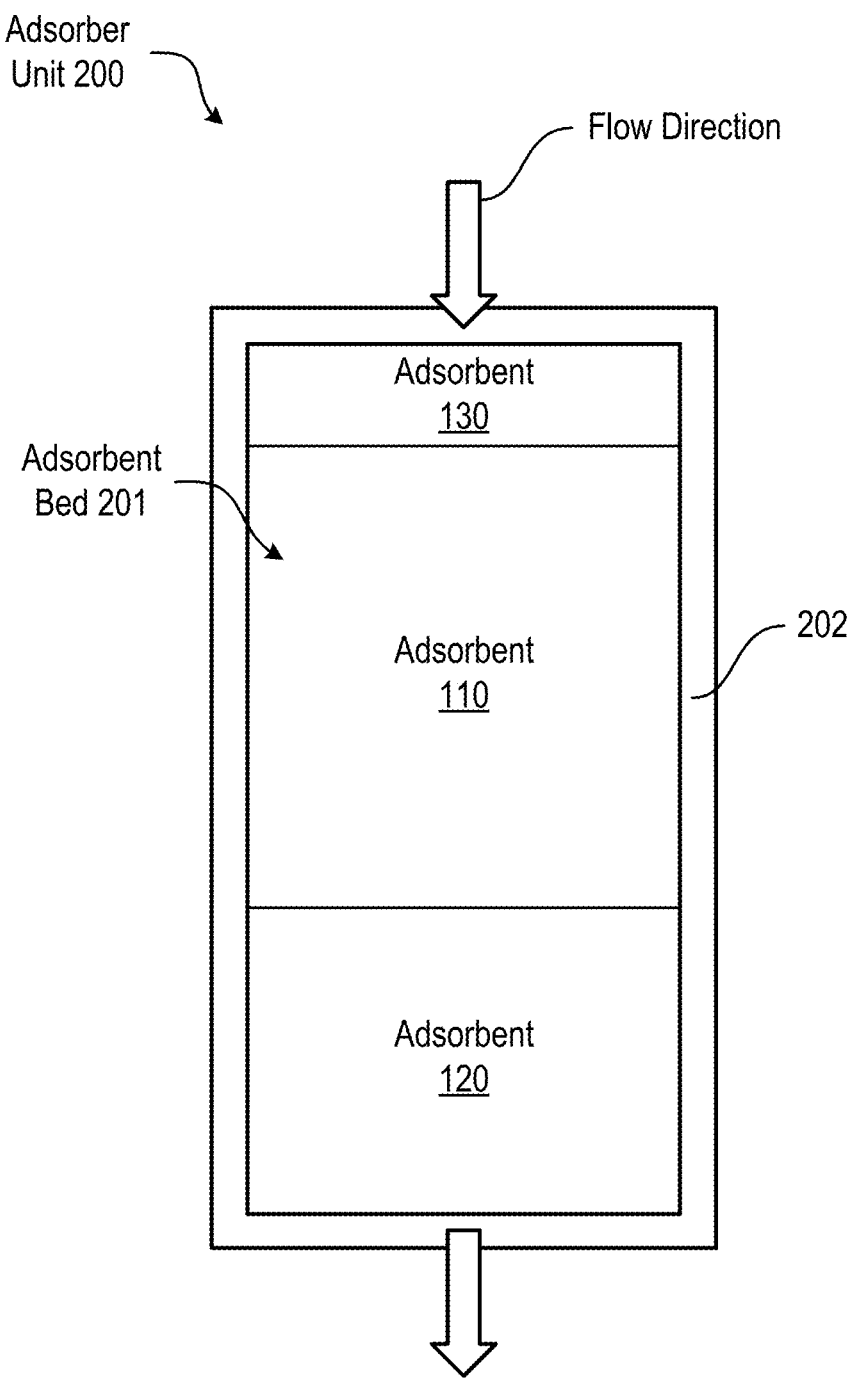
FIG. 2A illustrates another adsorber unit in accordance with at least one embodiment of the disclosure.

FIG. 2A illustrates a further adsorber unit 200 in accordance with at least one embodiment of the disclosure. The adsorbent bed 201 in the vessel 202 of the adsorber unit 200 is similar to the adsorbent bed 101, except that in addition to the adsorbent layer 110 and adsorbent layer 120, the adsorbent bed 201 further includes an adsorbent layer 130 immediately upstream from the adsorbent layer 110. In some embodiments, the adsorbent layer 130 comprises a water stable adsorbent, such as Durasorb™ HD (available from BASF), comprising, for example, silica or silica-alumina.

Figure 2B:
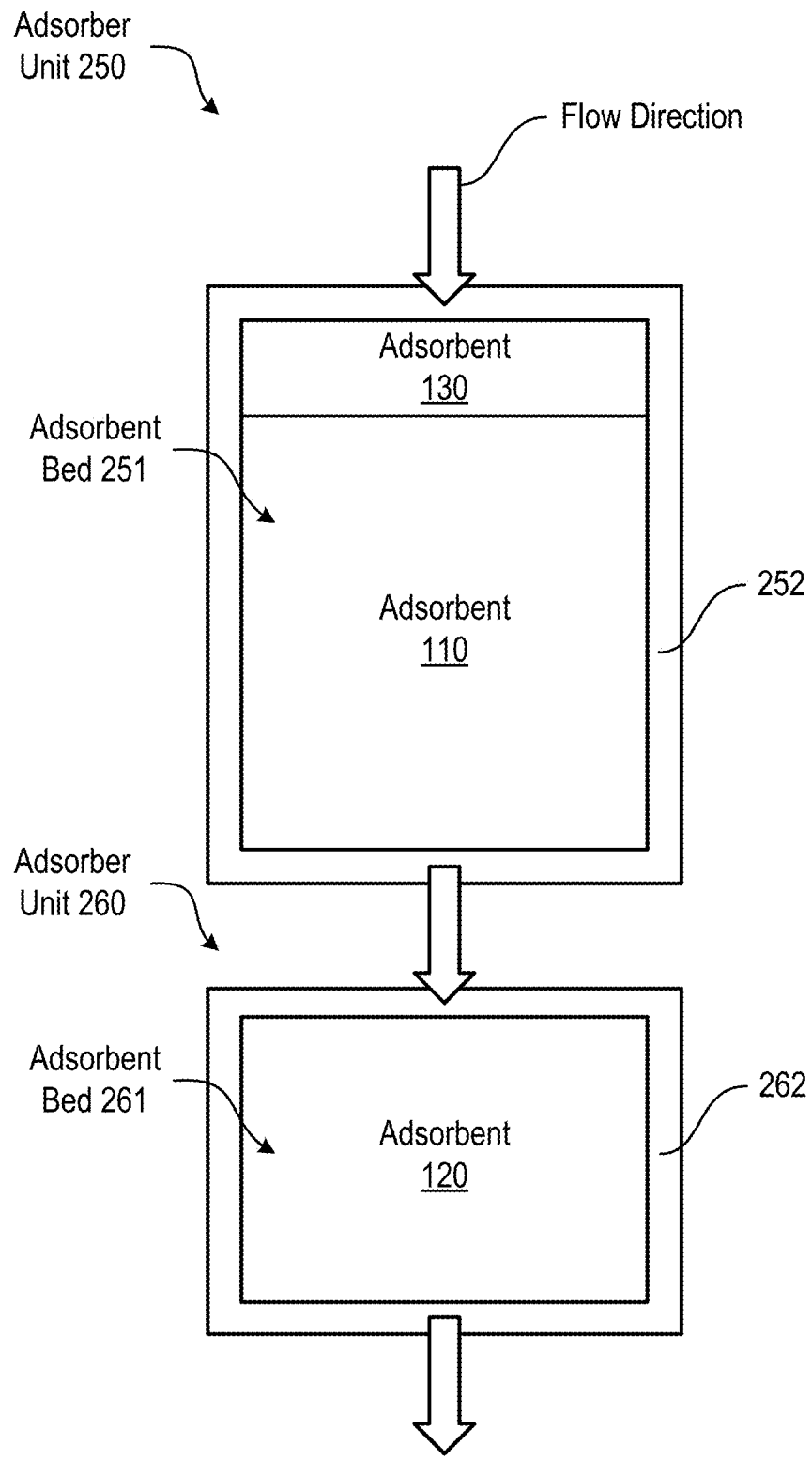
FIG. 2B illustrates a variation of the configuration of FIG. 2A which includes multiple adsorber units in accordance with at least one embodiment of the disclosure.

FIG. 2B shows a variant of FIG. 2A, where separate adsorber units 250 and 260 are used, each having separate vessels 252 and 262, respectively, for housing adsorbent beds 251 and 261, respectively. For example, the adsorbent layers 130 and 110 are contained in the vessel 252 of the adsorber unit 250, and the adsorbent layer 120 is contained within the vessel 262 of the adsorber unit 260, with the adsorber unit 260 being downstream from the adsorber unit 250. In some embodiments, each of the adsorbents 110, 120, and 130 may be contained within separate vessels of separate adsorber units. As discussed above with respect to FIG. 1B, duplicate adsorbent beds and vessels may be present in each of the adsorber units 250 and 260 to facilitate the implementation of a continuous TSA process.

Figure 3A:
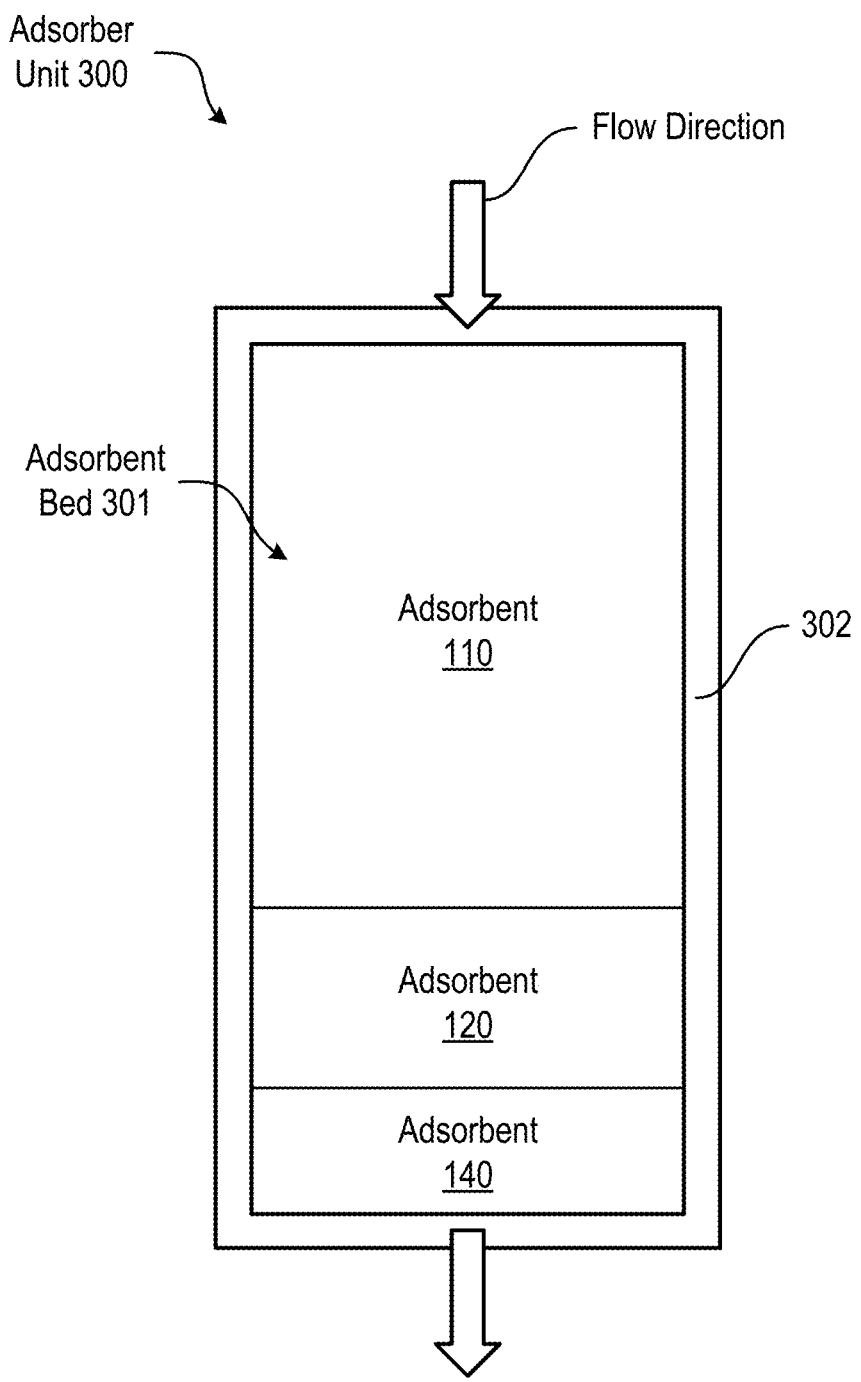
FIG. 3A illustrates another adsorber unit in accordance with at least one embodiment of the disclosure.

FIG. 3A illustrates a further adsorber unit 300 in accordance with at least one embodiment of the disclosure. The adsorbent bed 301 in the vessel 302 of the adsorber unit 300 is similar to the adsorbent bed 101, except that in addition to the adsorbent layer 110 and adsorbent layer 120, the adsorbent bed 301 further includes an adsorbent layer 140 immediately downstream from the adsorbent layer 120. In some embodiments, the adsorbent layer 140 comprises an amorphous silica adsorbent or an amorphous silica-alumina adsorbent. In some embodiments, the adsorbent layer 140 comprises zeolite X or zeolite Y. An exemplary adsorbent for the adsorbent layer 140 may include one or more of Durasorb™ BTX, Durasorb™ HC, or Durasorb™ AR.

Figure 3B:
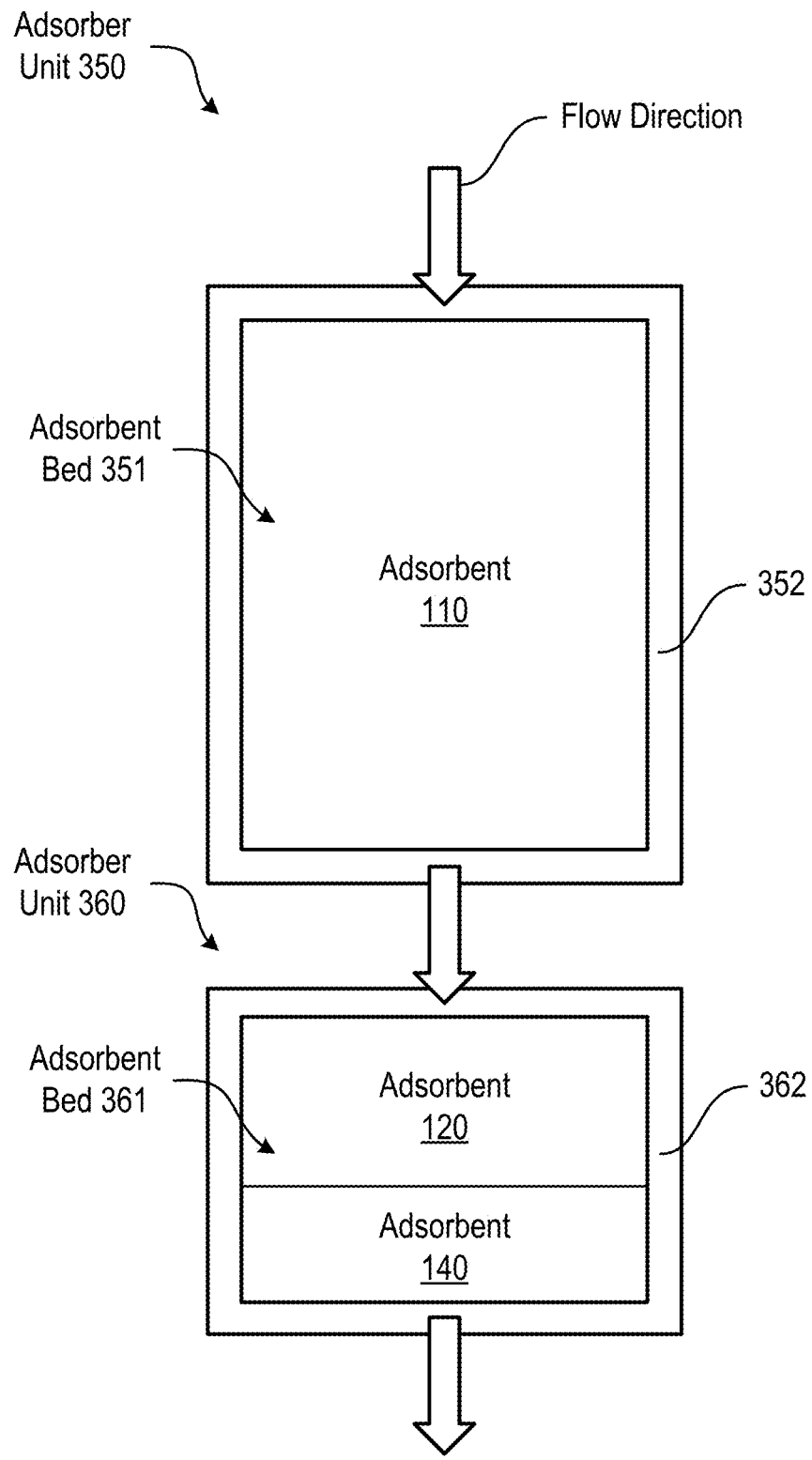
FIG. 3B illustrates a variation of the configuration of FIG. 3A which includes multiple adsorber units in accordance with at least one embodiment of the disclosure.

FIG. 3B shows a variant of FIG. 3A, where separate adsorber units 350 and 360 are used, each having separate vessels 352 and 362, respectively, for housing adsorbent beds 351 and 361, respectively. For example, the adsorbent layer 110 is contained in the vessel 352 of the adsorber unit 350, and the adsorbent layers 120 and 140 are contained within the vessel 362 of the adsorber unit 360, with the adsorber unit 360 being downstream from the adsorber unit 350. In some embodiments, each of the adsorbent layers 110, 120, and 140 may be contained within separate vessels of separate adsorber units. In some embodiments, the adsorbents 110 and 120 may be in the same vessel of the same adsorber unit, and the adsorbent layer 140 may be in a separate vessel of a separate adsorber unit. As discussed above with respect to FIG. 1B, duplicate adsorbent beds and vessels may be present in each of the adsorber units 350 and 360 to facilitate the implementation of a continuous TSA process.

Figure 4A:
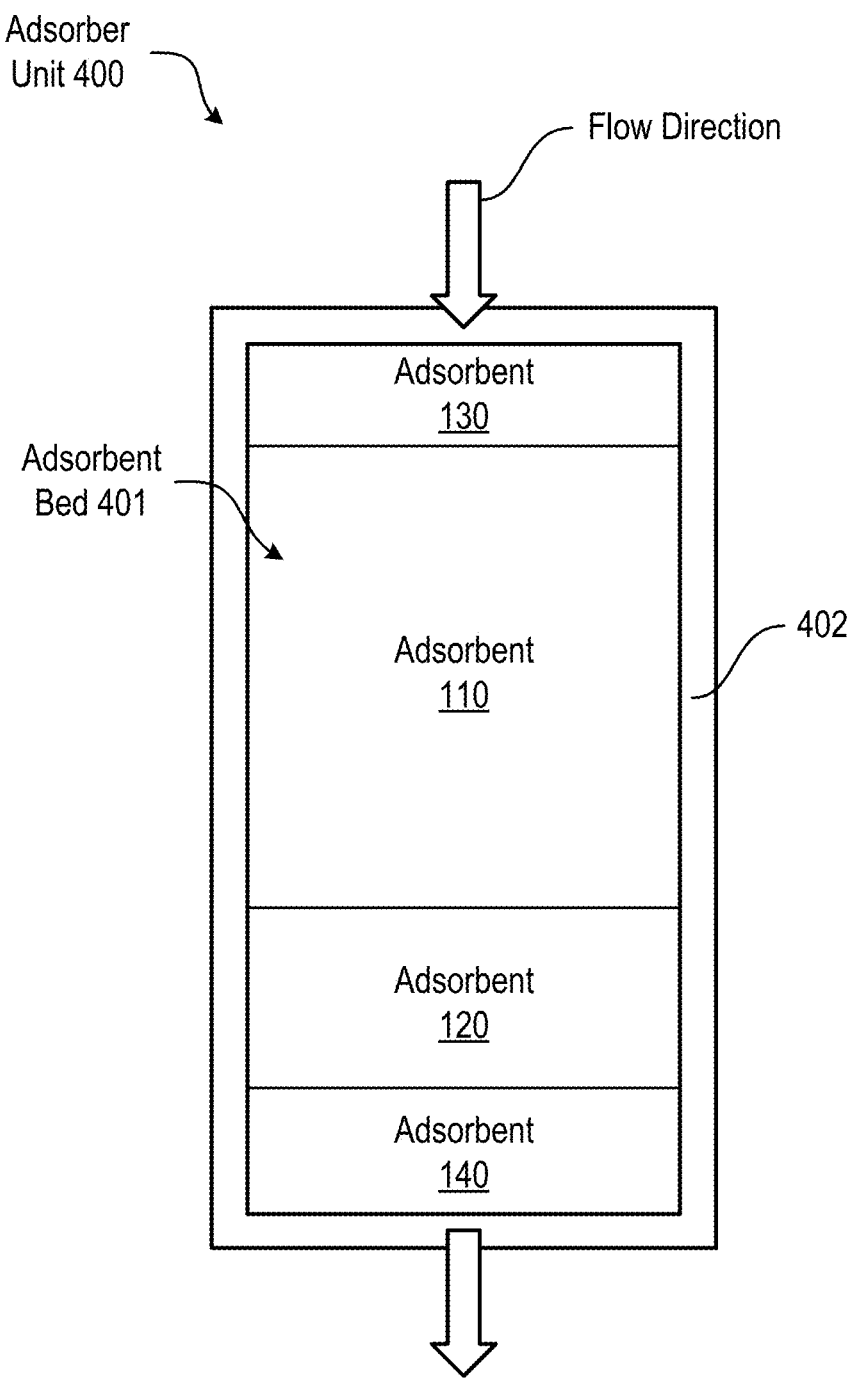
FIG. 4A illustrates another adsorber unit in accordance with at least one embodiment of the disclosure.
Figure 4B:
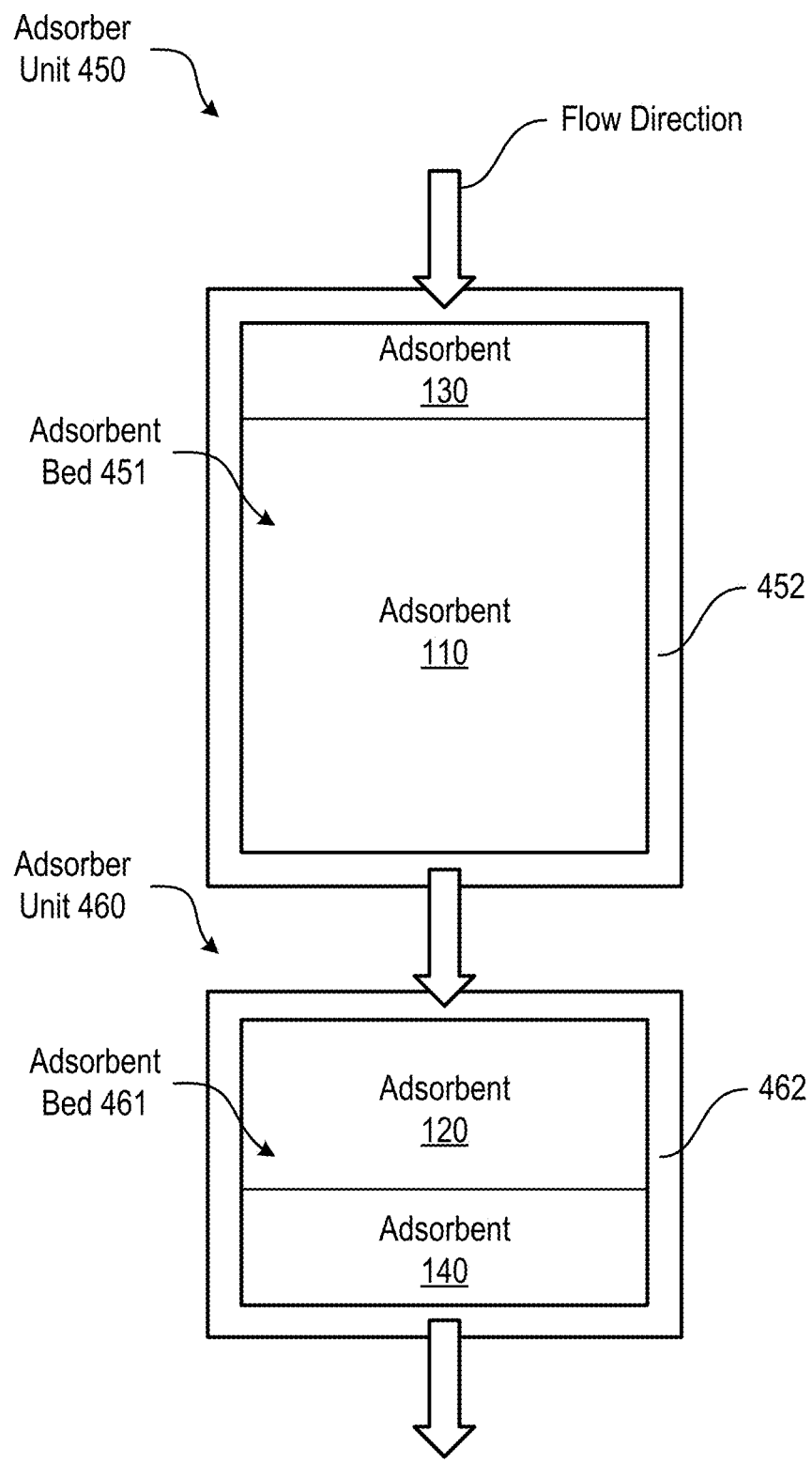
FIG. 4B illustrates a variation of the configuration of FIG. 4A which includes multiple adsorber units in accordance with at least one embodiment of the disclosure.

FIG. 4A illustrates a further adsorber unit 400 in accordance with at least one embodiment of the disclosure. The adsorbent bed 401 in the vessel 402 of the adsorber unit 400 may be a combination of the adsorbent bed 201 and the adsorbent bed 301 as described above. FIG. 4B shows a variant of FIG. 4A, where separate adsorber units 450 and 460 are used, each having separate vessels 452 and 462, respectively, for housing adsorbent beds 451 and 461, respectively. For example, the adsorbent layers 110 and 130 are contained in the vessel 452 of the adsorber unit 450, and the adsorbent layers 120 and 140 are contained within the vessel 462 of the adsorber unit 460, with the adsorber unit 460 being downstream from the adsorber unit 450. In some embodiments, each of the adsorbent layers 110, 120, 130, and 140 may be contained within separate vessels of separate adsorber units. Other permutations of these configurations are contemplated, as would be readily understood by one of ordinary skill in the art. As discussed above with respect to FIG. 1B, duplicate adsorbent beds and vessels may be present in each of the adsorber units 450 and 460 to facilitate the implementation of a continuous TSA process.

It is contemplated that a dual- or multi-unit configuration could be applied to any of the adsorber units 100, 200, 300, or 400. In some embodiments, for embodiments for which the adsorbent beds are part of a TSA process, a cycle time may vary for different adsorber units in a multi-unit configuration. For example, with reference to FIG. 1B, the adsorber unit 150 (for which the adsorbent bed 151 may contain, for example, an amorphous silica adsorbent, an amorphous silica-alumina adsorbent, or a high-silica zeolite adsorbent) may be subject to a cycle time of less or equal to about 8 hours, about 7 hours, about 6 hours, about 5 hours, about 4 hours, about 3 hours, about 2 hours, or about 1 hour. The adsorber unit 160 (for which the adsorbent bed 161 may contain, for example, a zeolite) may be subject to a cycle time that is longer than that of the adsorber unit 150, such as greater than 10 hours and up to 24 hours, up to 48 hours, or up to 72 hours. Similar variations in the cycle times may be applied to each of the configurations of FIGS. 2B, 3B, and 4B.

Figure 5:
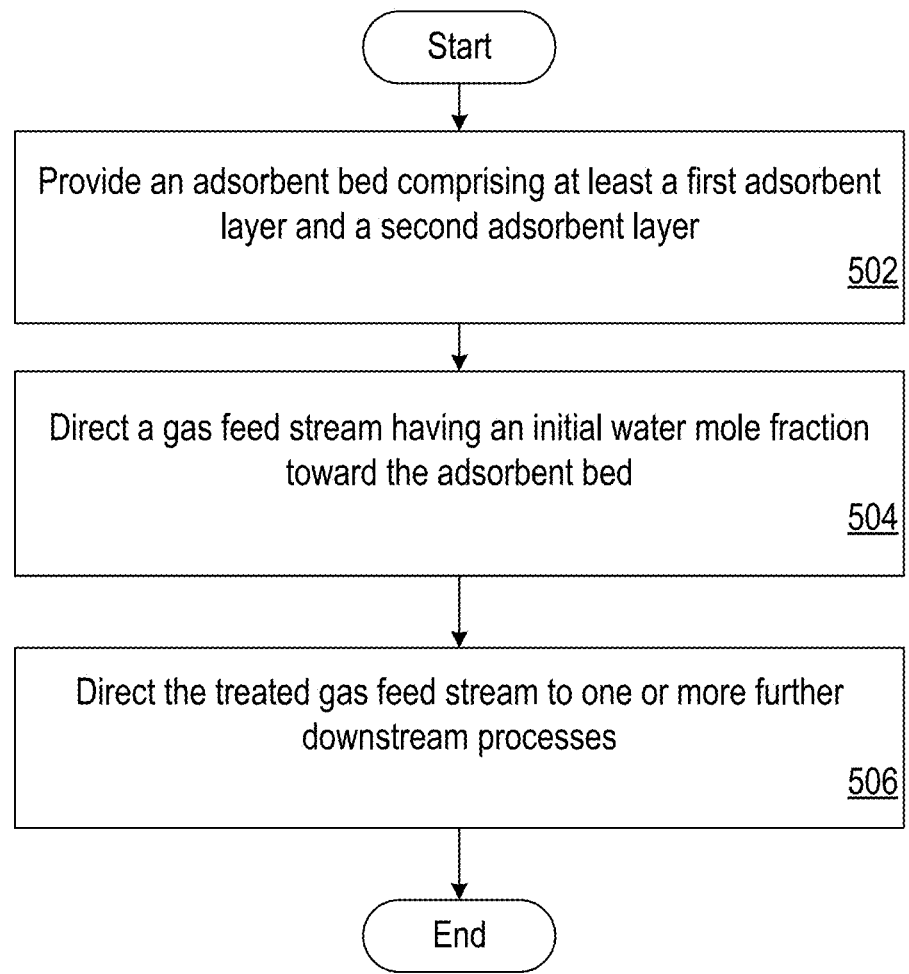
FIG. 5 illustrates a method for removing water from a gas feed stream in accordance with an embodiment of the disclosure.

FIG. 5 illustrates a method 500 for removing water from a gas feed stream in accordance with an embodiment of the disclosure. At block 502, an adsorbent bed (e.g., any of adsorbent beds 101, 201, 301, 401, or modifications thereof) is provided, the adsorbent bed comprising at least a first adsorbent layer (e.g., the adsorbent layer 110) and a second adsorbent layer (e.g., the adsorbent layer 120).

At block 504, a gas feed stream having an initial water mole fraction is directed toward the adsorbent bed. In some embodiments, the gas feed stream comprises a natural gas feed stream. In some embodiments, the gas feed stream comprises predominately methane (at least 50% methane on a molar basis). In some embodiments, the gas feed stream comprises predominately $CO_2$ (at least 50% $CO_2$ on a molar basis). In some embodiments, the contact is performed as part of a TSA process. The TSA process may have an adsorption cycle time of less or equal to about 8 hours, about 7 hours, about 6 hours, about 5 hours, about 4 hours, about 3 hours, about 2 hours, or about 1 hour.

The gas feed stream may have an initial water mole fraction and an initial C5+ or C6+ hydrocarbon mole fraction prior to entering the adsorbent bed and contacting the first adsorbent layer. After passing through the first adsorbent layer, the gas feed stream has a reduced water mole fraction compared to the initial water mole fraction when the gas feed stream reaches the second adsorbent layer. In some embodiments, block 504 corresponds to an adsorption step in an adsorption cycle in a TSA process. In some embodiments, the reduced water mole fraction is maintained for at least 90% of the duration of the adsorption step. That is, the second adsorbent layer, which is less hydrothermally stable than the first adsorbent layer, is contacted with less water than the first adsorbent layer, which increases the overall lifetime of the second adsorbent layer over several TSA cycles. In some embodiments, the reduced water mole fraction is maintained for at least 95%, at least 96%, at least 97%, at least 98%, at least 99%, or 100% of the duration of the adsorption step.

In some embodiments, the reduced water mole fraction is less than or equal to about 90% of the initial water mole fraction. In some embodiments, the reduced water mole fraction is less than about 80%, about 70%, about 60%, about 50%, about 40%, about 30%, about 20%, about 10%, about 9%, about 8%, about 7%, about 6%, about 5%, about 4%, about 3%, about 2%, or about 1% of the initial water mole fraction. In some embodiments, the reduced water mole fraction is less than about 20% of the initial water mole fraction. In some embodiments, the initial water mole fraction is from about 500 ppm to about 1500 ppm, while the reduced water mole fraction is less than or equal to about 500 ppm, about 450 ppm, about 400 ppm, about 350 ppm, about 300 ppm, about 250 ppm, about 200 ppm, about 150 ppm, about 100 ppm, about 50 ppm, about 40 ppm, about 30 ppm, about 20 ppm, about 10 ppm, or about 5 ppm. In other embodiments, the reduced water mole fraction is less than or equal to about 100 ppm, about 50 ppm, about 10 ppm, about 9 ppm, about 8 ppm, about 7 ppm, about 6 ppm, about 5 ppm, about 4 ppm, about 3 ppm, about 2 ppm, or about 1 ppm.

In some embodiments, the gas feed stream has an initial C6+ hydrocarbon mole fraction prior to entering the adsorbent bed that is from about 500 ppm to about 1500 ppm. The gas feed stream may have a reduced C6+ hydrocarbon mole fraction after exiting the adsorbent bed that less than or equal to about 450 ppm, about 400 ppm, about 350 ppm, about 300 ppm, about 250 ppm, about 200 ppm, about 150 ppm, about 100 ppm, about 50 ppm, about 40 ppm, about 30 ppm, about 20 ppm, about 10 ppm, about 5 ppm, about 4, about 3 ppm, about 2 ppm, or about 1 ppm. The gas feed stream may have a reduced C6+ hydrocarbon mole fraction after contacting the first adsorbent layer but prior to contacting the second adsorbent layer that less than or equal to about 450 ppm, about 400 ppm, about 350 ppm, about 300 ppm, about 250 ppm, about 200 ppm, about 150 ppm, about 100 ppm, about 50 ppm, about 40 ppm, about 30 ppm, about 20 ppm, about 10 ppm, about 5 ppm, about 4, about 3 ppm, about 2 ppm, or about 1 ppm.

In some embodiments, one or more components of the hydrocarbons in the gas feed stream is reduced by 100%, 90%, 80%, 70%, 60%, 50%, 40%, 30%, 20%, 10%, or 5% on a molar basis relative to an initial concentration of that component in the gas feed stream, with the one or more components being selected from benzene, C9 hydrocarbons, C8 hydrocarbons, C7 hydrocarbons, C6 hydrocarbons, or C5 hydrocarbons. That is, for a given component in the gas feed stream (e.g., benzene), a concentration of the component in the gas feed stream after passing through the adsorbent bed will be reduced by a specific amount on a molar basis relative to the initial concentration.

At block 506, the treated gas feed stream is directed to one or more further downstream processes, such as additional adsorption steps. In some embodiments, a downstream process may be forming a liquefied natural gas product from the gas feed stream if the treated gas feed stream meets cryogenic specifications. For example, final water mole fraction of the gas feed stream after leaving the adsorbent bed may be below 1 ppm or below 0.1 ppm. In some embodiments, the downstream process may be forming a C2+ or C3+ natural gas liquid feed stream from the gas feed stream.

In some embodiments, the adsorbent bed may be regenerated using a clean dry gas stream, such as a product gas from the adsorbent bed (e.g., a treated stream leaving the adsorbent bed) or a stream external to the adsorber unit of which the adsorbent bed is a part. The term "clean dry gas stream" refers to a stream that contains between 0.1 ppm and 100 ppm water, preferably 0.1 ppm to 10 ppm water, and C5+ hydrocarbon species no more the 100 times the concentration of the product gas of those corresponding species, preferably less than 10 times the C5+ hydrocarbons species of the product gas. In some embodiments, if the second adsorbent layer is part of a separate adsorber unit than the first adsorbent layer, a clean dry gas stream from the separate adsorber unit may be used to regenerate the second adsorbent layer.

In some embodiments, the adsorbent bed may be retrofitted or refilled by removing and replacing at least a portion of a previously present adsorbent with one or more of the first adsorbent layer or the second adsorbent layer. Retrofitting can include installing internal insulation into the vessel (e.g., the vessel 102), changing adsorption time, changing heating time, changing cooling time, changing regeneration gas flow rate, and changing regeneration gas temperature. In some embodiments, a zeolite material that has been hydrothermally damaged may be replaced with a zeolite adsorbent (e.g., the adsorbent layer 120) that has not been hydrothermally damaged or still has sufficient adsorption capacity.

ILLUSTRATIVE EXAMPLES

The following examples are set forth to assist in understanding the disclosure and should not, of course, be construed as specifically limiting the embodiments described and claimed herein. Such variations of the disclosed embodiments, including the substitution of all equivalents now known or later developed, which would be within the purview of those skilled in the art, and changes in formulation or minor changes in experimental design, are to be considered to fall within the scope of the embodiments incorporated herein.

Example 1

Figure 6:
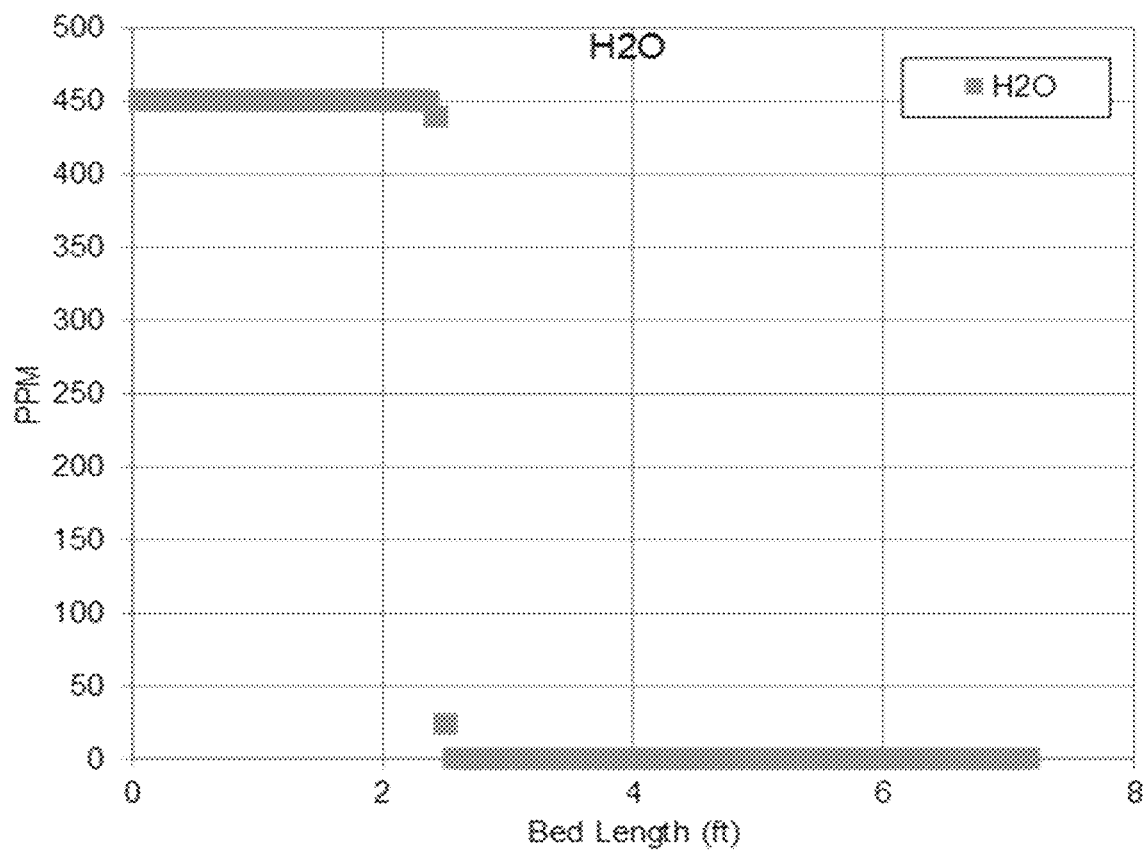
FIG. 6 shows a simulated $H_2O$ profile of a zeolite 4A sieve bed at the end of adsorption.

A bed of zeolite 4A (Durasorb™ HR4) was simulated with a feed of 450 ppm of water. The bed contained 30000 kg of zeolite 4A with a volume of 43 m$^3$. The bed was operated at a temperature of 25° C. and a pressure of 62 bara. A flow rate of 176000 Nm$^3$/hr (normal meters cubed per hour) was simulated. FIG. 6 shows an H$_2$O profile of a zeolite 4A bed at the end of adsorption.

Example 2

Figure 7:
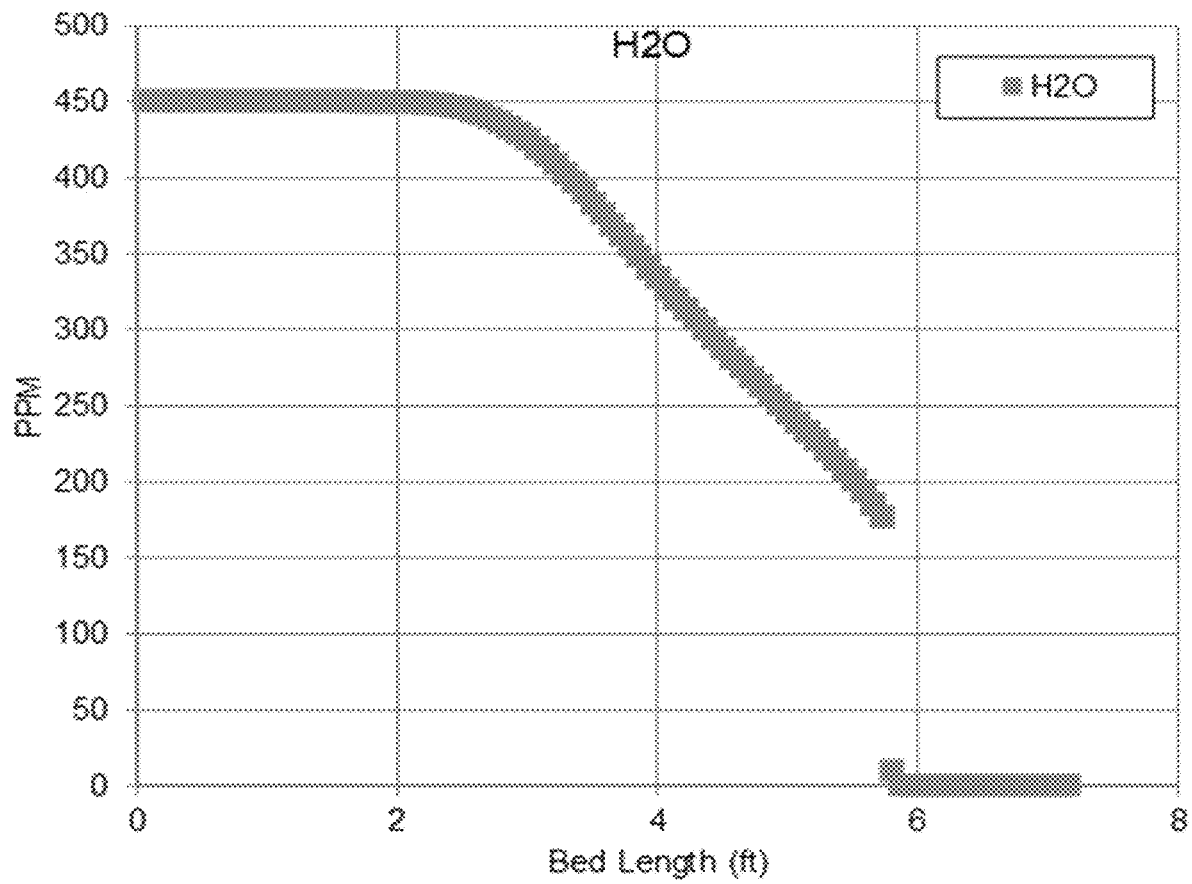
FIG. 7 shows a simulated $H_2O$ profile of a Durasorb™ HD and zeolite 4A sieve bed at the end of adsorption.

A bed of Durasorb™ HD 24000 kg and zeolite 4A was simulated with a feed of 450 ppm of water. The bed contained 6000 kg of zeolite 4A with a volume of 43 m$^3$. The bed was operated at a temperature of 25° C. and a pressure of 62 bara. A flow rate of 176000 Nm$^3$/hr was simulated. FIG. 7 shows an H$_2$O profile of the Durasorb™ HD and zeolite 4A bed at the end of adsorption.

Examples 3-6

The following examples illustrate that if the water content to the zeolite 4A layer is reduced, the amount of water at elevated temperatures during regeneration of the bed can be reduced, which in turn will reduce the degree of hydrothermal damage.

The same volume (43 m$^3$) of zeolite 4A was simulated for the remaining examples. A feed at 25° C. and 62 bar was fed to the bed. All beds were allowed to run such that the entire bed was saturated at the feed conditions. For example, in Example 3, 450 ppm of water was leaving the adsorbent bed at the end of adsorption. Similarly, in Example 6, 10 ppm of water was leaving the bed on adsorption. All beds were regenerated with 14500 Nm$^3$/hr of gas at 295° C.

Figure 8:
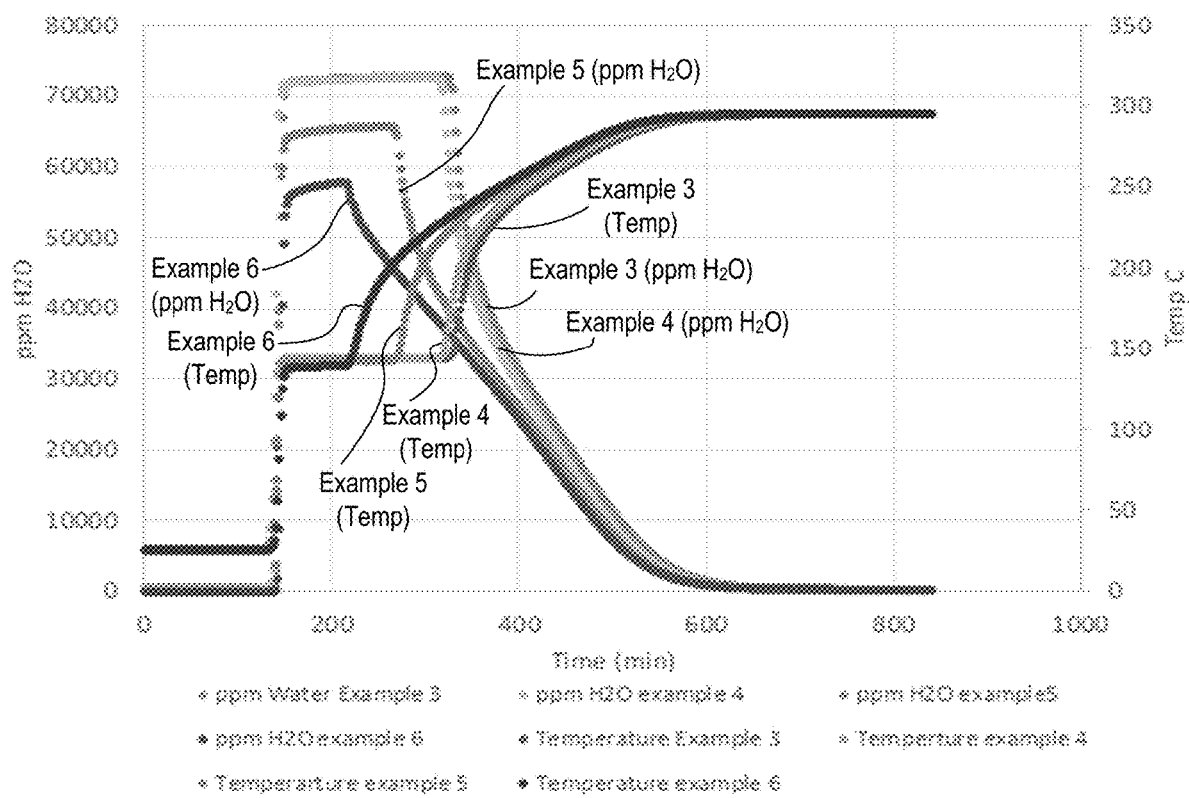
FIG. 8 shows outlet composition and temperature for various simulated adsorber units.

FIG. 8 shows the outlet composition and temperature for each of Example 3 (feed of 450 ppm water), Example 4 (feed of 180 ppm water), Example 5 (feed of 10 ppm water), and Example 6 (feed of 5 ppm water). As clearly illustrated, the combination of water concentration, temperature, and time was reduced as the amount of water in the feed to the zeolite section was reduced. For example, the 5 ppm water feed is at its maximum water concentration for approximately 70 minutes, whereas the 450 ppm water feed is at the maximum water concentration for 170 minutes. Not illustrated but implicit is that as the zeolite fraction of the bed is reduced at the time the zeolite will be at high concentration, water and temperature will be reduced for a fixed regeneration flow. Consequently, Examples 3-6 represent a worst case scenario such that if the zeolite was only 20% of the beds in those cases, the time scale they would be exposed to elevated water would have been reduced further by a factor of 5, thereby reducing the degree of hydrothermal damage even further for all cases.

In the foregoing description, numerous specific details are set forth, such as specific materials, dimensions, processes parameters, etc., to provide a thorough understanding of the embodiments of the present disclosure. The particular features, structures, materials, or characteristics may be combined in any suitable manner in one or more embodiments. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Reference throughout this specification to "an embodiment", "certain embodiments", or "one embodiment" means that a particular feature, structure, or characteristic described in connection with the embodiment is included in at least one embodiment. Thus, the appearances of the phrase "an embodiment", "certain embodiments", or "one embodiment" in various places throughout this specification are not necessarily all referring to the same embodiment, and such references mean "at least one".

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method of removing water from a gas feed stream comprising hydrocarbons and water during an adsorption step of an adsorption cycle, the method comprising:
    directing the gas feed stream having an initial water mole fraction toward an adsorbent bed, the adsorbent bed comprising:
        a first adsorbent layer comprising an adsorbent that is preferentially selective for C6+ hydrocarbons and comprises one or more of an amorphous silica adsorbent, an amorphous silica-alumina adsorbent, or a high-silica zeolite adsorbent, wherein a weight percent (wt. %) of the first adsorbent layer with respect to the total weight of the adsorbent bed is greater than 50 wt. %; and
        a second adsorbent layer downstream from the first adsorbent layer to remove remaining water, the second adsorbent layer comprising a zeolite,
    wherein, after passing through the first adsorbent layer, the gas feed stream has a reduced water mole fraction that is less than or equal to 10% of the initial water mole fraction when the gas feed stream reaches the second adsorbent layer.

2. The method of claim 1, wherein the reduced water mole fraction is less than or equal to about 100 ppm.

3. The method of claim 1, wherein the first adsorbent layer comprises the high-silica zeolite adsorbent.

4. The method of claim 1, wherein the second adsorbent layer comprises one or more of zeolite A, zeolite X, or zeolite Y.

5. The method of claim 1, wherein the adsorbent bed further comprises a third adsorbent layer downstream from the second adsorbent layer, the third adsorbent layer comprising an amorphous silica adsorbent or an amorphous silica-alumina adsorbent.

6. The method of claim 1, wherein the adsorbent bed further comprises a third adsorbent layer downstream from the second adsorbent layer, the third adsorbent layer comprising zeolite X or zeolite Y.

7. The method of claim 1, wherein the adsorbent bed further comprises a third adsorbent layer downstream from the second adsorbent layer, the third adsorbent layer having a higher selectivity to n-pentane over methane.

8. The method of claim 1, wherein the adsorbent bed further comprises a third adsorbent layer upstream from the first adsorbent layer, the third adsorbent layer comprising a water stable adsorbent.

9. The method of claim 1, wherein the gas feed stream is a natural gas feed stream.

10. The method of claim 1, wherein a final water mole fraction of the gas feed stream leaving the adsorbent bed is below 1 ppm or below 0.1 ppm.

11. The method of claim 1, further comprising:
    forming a liquefied natural gas product from the gas feed stream after leaving the adsorbent bed.

12. The method of claim 1, further comprising:
    forming a C2+ or C3+ natural gas liquid feed stream from the gas feed stream after leaving the adsorbent bed.

13. The method of claim 1, wherein the method is performed as part of a thermal swing adsorption process having a cycle time of less than or equal to about 8 hours, about 7 hours, about 6 hours, about 5 hours, about 4 hours, about 3 hours, about 2 hours, or about 1 hour.

14. The method of claim 1, wherein one or more components of the hydrocarbons in the gas feed stream is reduced by 100%, 90%, 80%, 70%, 60%, 50%, 40%, 30%, 20%, 10%, or 5% on a molar basis relative to an initial concentration of that component in the gas feed stream, wherein the one or more components are selected from a group consisting of benzene, C9 hydrocarbons, C8 hydrocarbons, C7 hydrocarbons, C6 hydrocarbons, and C5 hydrocarbons.

15. The method of claim 1, further comprising:
    prior to directing the gas feed stream toward the adsorbent bed, retrofitting the adsorbent bed by removing and replacing at least a portion of a previously present adsorbent with one or more of the first adsorbent layer or the second adsorbent layer.

* * * * *